US006906109B2

United States Patent
Paszkowski

(10) Patent No.: US 6,906,109 B2
(45) Date of Patent: Jun. 14, 2005

(54) METHOD FOR CONTROLING UNIFORMITY OF COLLOIDAL SILICA PARTICLE SIZE

(75) Inventor: Andrew Joseph Paszkowski, Kennesaw, GA (US)

(73) Assignee: Chemical Products Corp., Cartersville, GA (US)

( * ) Notice: Subject to any disclaimer, the term of this patent is extended or adjusted under 35 U.S.C. 154(b) by 125 days.

(21) Appl. No.: 10/307,002

(22) Filed: Nov. 30, 2002

(65) Prior Publication Data

US 2003/0111417 A1 Jun. 19, 2003

Related U.S. Application Data

(63) Continuation-in-part of application No. 09/653,732, filed on Sep. 1, 2000, now Pat. No. 6,747,065.

(51) Int. Cl.$^7$ ............................................. B01D 15/00
(52) U.S. Cl. ......................................... 516/83; 210/687
(58) Field of Search .............................. 516/83; 210/687

(56) References Cited

U.S. PATENT DOCUMENTS 3,789,009 A * 1/1974 Irani ............................ 516/83
5,788,454 A 8/1998 Thompson et al.
6,747,065 B1 * 6/2004 Paszkowski ................. 516/83

FOREIGN PATENT DOCUMENTS

| EP | 1119022 A2 | 7/2001 |
| EP | 1119022 A3 | 7/2001 |
| EP | 690480 B1 | 3/2002 |

* cited by examiner

Primary Examiner—Chester T. Barry
(74) Attorney, Agent, or Firm—Todd Deveau; Thomas, Kayden, Horstemeyer & Risley LLP

(57) ABSTRACT

A system and method are disclosed for producing uniform size silica particles by the steps of providing preformed colloidal silica particles having a surface area, adding an alkali metal silicate and a cation exchange resin to produce a quantity of feed silica at a feed rate which is less than a nucleation rate, and increasing the feed rate as the feed silica is added wherein the feed rate is less than the nucleation rate.

23 Claims, 2 Drawing Sheets

METHOD FOR CONTROLING UNIFORMITY OF COLLOIDAL SILICA PARTICLE SIZE

RELATED APPLICATIONS

This application is a continuation-in-part of issued U.S. patent application Ser. No. 09/653,732, filed Sep. 1, 2000 now U.S. Pat. No. 6,747,065, entitled "System and Method for Producing High Purity Colloidal Silica and Potassium Hydroxide," the disclosure of which is incorporated herein by reference.

BACKGROUND OF THE INVENTION

Colloidal silica is a suspension of very small, spherical particles of amorphous (not crystalline) silica suspended in water. The material is colloidal in that the silica particles do not settle out of the solution. The silica particles generally range in size from about 8 nanometers to a maximum size of about 80 nanometers, beyond which the silica ceases to be colloidal and begins to settle out of solution. Colloidal silica has been used for a variety of purposes, including precision casting, as a lining for molds, as a frictionizing (non-skid) agent, and in a variety of medical and pharmaceutical uses such as toothpaste, dental castings and drug delivery systems.

One relatively recent use which has arisen for colloidal silica is in the polishing of semiconductor materials, such as the silicon wafers used in computer chips, by a process known as Chemical Mechanical Planarization (CMP). CMP involves the polishing of semiconductors and chips using very small abrasive particles of silica alumina, ceria or other materials in a slurry or suspension with a chemically active carrier solution. Colloidal silica has also recently come into use in polishing other items such as hard disk drives, electronic memory devices and raw silicon oxide wafers to accomplish the rough polishing of chips prior to CMP.

The electrical performance of finished semiconductor chips can easily be affected by contaminants to which the semiconductor wafers are exposed during processing. Such contamination can be in the form of discrete particles and water soluble or dispersed organic and inorganic impurities. In particular, the use of silica sols that are contaminated with trace transition metals, alkali and alkaline earth metals, aluminum, and other metals causes difficulties when used in wafer polishing. Sodium, potassium, alkali and alkaline earth metals such as calcium, magnesium, and transition metals such as iron, copper, manganese, nickel, and zinc are particularly troublesome. In general, any transition metal from groups IB, IIB, IIIB, IVB, VB, VIB, and group VIII of the Periodic Table of Elements, if present in high enough concentrations, can cause difficulties in the final products manufactured with silica sols containing these contaminants.

An additional problem of metal contaminants is that many of these substances have much higher diffusivities in both silicon and silicon dioxide than do the more conventional dopants, such as phosphorus and boron. As a result, unpredictable electrical properties can result when silicon wafers are contaminated with these metals. For example, alkali metals such as lithium, sodium, and potassium cause shifts in electrical properties (threshold and flat-band voltages) when incorporated into semiconductor devices.

Currently used colloidal silica CMP slurries generally include a relatively high amount of contaminating sodium, which is very difficult to remove. The contaminating sodium causes defects in the chips in the later manufacturing processes. Accordingly, there is a need for an improved method for producing very low sodium content colloidal silica for use in these applications. There is also a need for an improved method of producing high purity potassium hydroxide which is also an additive used in some CMP slurries.

One method which has been developed in an attempt to produce a low sodium potassium stabilized silica sol is disclosed in U.S. Pat. No. 4,915,870 to Jones. The method disclosed by Jones uses an acid sol process to produce a silica sol having a sodium concentration of less than 150 ppm using commercially available KOH to stabilize the pH of the sol. However, while the method disclosed by Jones is suitable for producing silica sols having a sodium concentration of less than 150 ppm, it would be preferable to produce silica sols having much lower sodium concentrations for use in electronics applications.

In addition to the problem of metal contaminants, current methods for growing colloidal silica particles do not produce larger particles that are uniform in size. Because of the importance in consistency of electrical properties in the manufacture of silicon wafers, it would be useful to be able to produce uniform size colloidal silica particles. Current methods do not produce particles of uniform size because the particles are grown at a rate which causes nucleation of the colloidal silica particles. Methods to produce uniform size colloidal silica particles have been found to be unusable for the production of larger particles because this process requires an impractical growth time due to the limitations on how the particles are grown.

Therefore, it is an object of the present invention to provide a useable system and method for producing uniform colloidal silica particles.

It is another object of the present invention to provide a process for producing colloidal silica particles having a uniform shape and size with a low sodium content.

BRIEF DESCRIPTION OF THE INVENTION

The above objectives are accomplished according to the present invention by providing a system and method for producing uniform size silica particles which includes the steps of providing preformed colloidal silica particles having a surface area, adding an alkali metal silicate and a cation exchange resin to produce a quantity of feed silica at a feed rate which is less than a nucleation rate which would cause nucleation of the preformed colloidal silica particles, and increasing the feed rate as the feed silica is added wherein the feed rate is less than the nucleation rate.

Other objects, aspects, and advantages of the present invention will be apparent to those skilled in the art from a reading of the following detailed disclosure of the invention.

BRIEF DESCRIPTION OF THE FIGURES

The construction and design to carry out the invention will hereinafter be described together with other features thereof. The invention will be more readily understood from a reading of the following specification and by reference to the accompanying drawings forming a part thereof, wherein an example of the invention is shown and wherein.

DETAILED DESCRIPTION OF THE PREFERRED EMBODIMENT

The formation of substantially uniform size silica particles in one embodiment of the present invention is accomplished by providing preformed colloidal silica particles having a surface area, adding an alkali metal silicate and a cation exchange resin to produce a quantity of feed silica at a feed rate which is less than the nucleation rate, and increasing the feed rate as the feed silica is added, wherein the feed rate is less than the nucleation rate. In a preferred embodiment, the cation exchange resin is selected from the group containing, carboxylic resins, sulfonated natural materials, and sulfonated styrene-dibenzene copolymers. In a preferred embodiment, the silicate salt used is a potassium silicate having a sodium concentration of less than 200 ppm and more preferably less than 100 ppm, though one of ordinary skill in the art should recognize than other silicate salts, such as lithium silicate, magnesium silicate, calcium silicate, and combinations thereof may also be suitable. A potassium silicate having less than 100 ppm sodium which has proven suitable is Zacsil E-200 from Zaclon, Inc. of Cleveland, Ohio. Because the initial silica salt used has a low sodium level, the resultant silica products also have a very low level of contaminating sodium in the range of 1–5 ppm. This sodium level may be further reduced by washing the silica with deionized water in an ultrafiltration device while adding potassium hydroxide to maintain the pH and cation concentration. The resulting product is a silica sol, based in potassium hydroxide which includes less than 1 ppm contaminating sodium, a purity much higher than is obtainable by conventional processes.

In the present invention, it has surprisingly been found that the particle size distribution of these sols can be even more precisely controlled than previously thought to be practical. By controlling the feed rate of the silica such that a certain maximum amount is fed as a function of specific surface area, so that the feed rate is always less than the nucleation rate. The nucleation rate is the feed rate which would cause nucleation of the colloidal silica particles. The feed rate is preferably 10.0 grams of silica, as $SiO_2$ per 1,000 meters squared of surface area per hour at 90 degrees Celcius, so that nucleation is avoided entirely.

In the present invention, the total surface area of the "heel" of particles is calculated at the beginning and then at regular intervals thereafter. The feed rate is then increased, in proportion to the total surface area to meet, but not exceed the nucleation rate, typically 10.0 grams/1,000 $m^2$-hr. In this manner, silica can be "grown" to any desired particle size, maintaining a narrow particle size distribution, while avoiding nucleation of new particles. By constantly recalculating the total surface area and adjusting the feed rate accordingly, the accretion of silica can be maximized and therefore, the production of the silica sol can be maximized.

Figure 1:
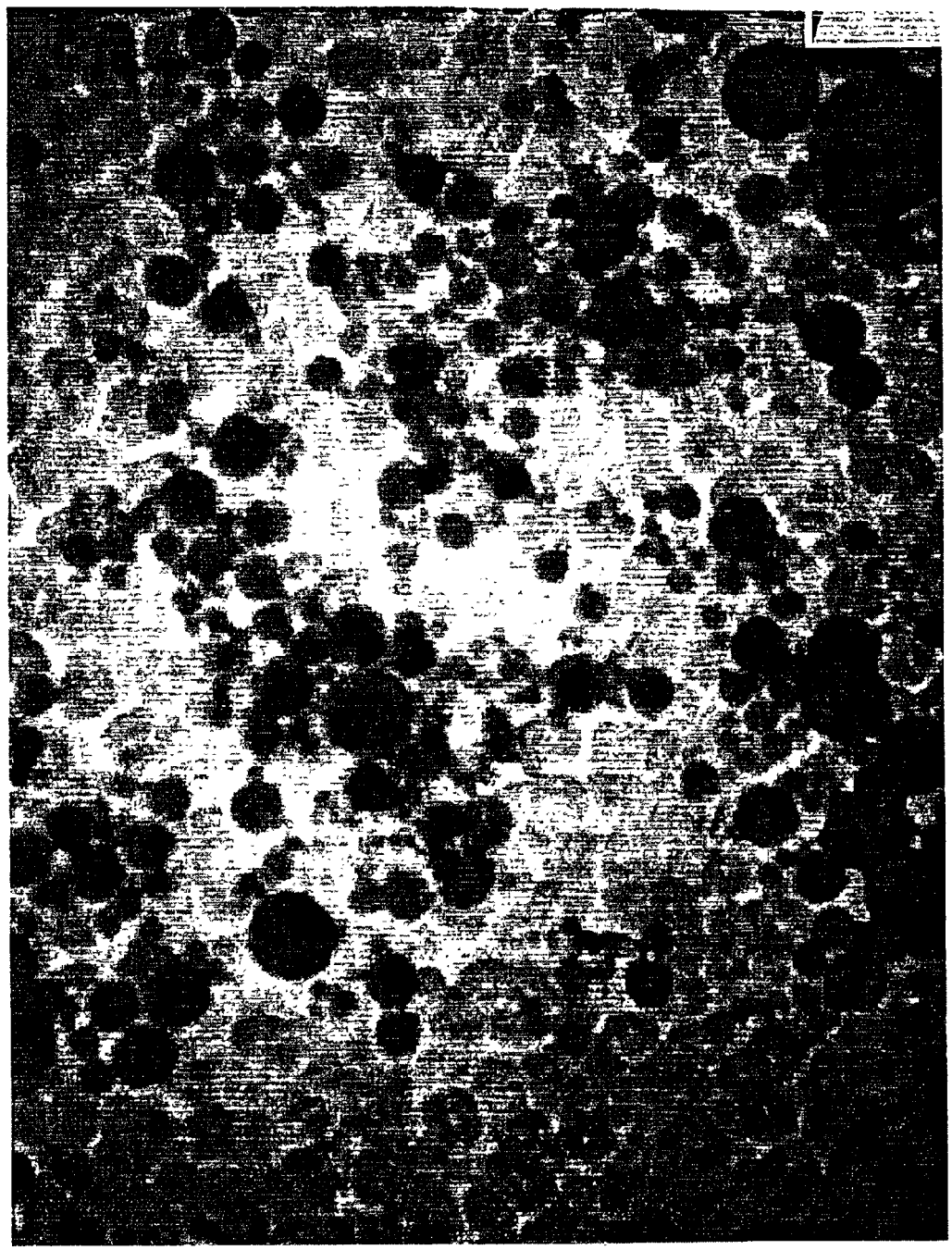
FIG. 1 is a photograph showing 50 nm colloidal silica particles that were formed using a feed rate greater than the nucleation rate.
Figure 2:
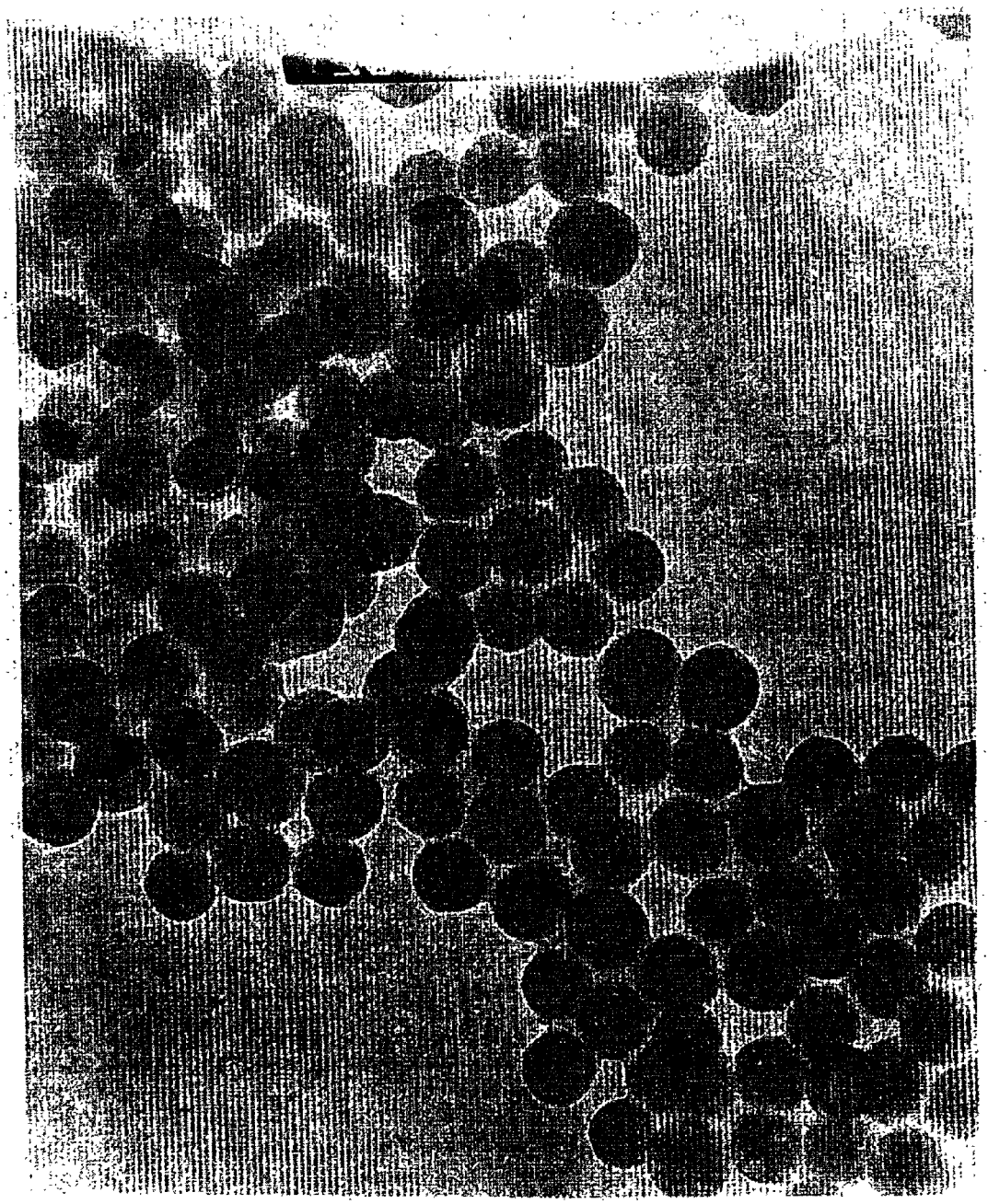
FIG. 2 is a photograph showing 50 nm colloidal silica particles formed using the method described herein.

Standard practice is to produce colloidal silica particles using a feed rate that is above the nucleation rate. This is illustrated in FIG. 1 showing what are purported to be 50 nm colloidal silica particles. Because this feed rates causes nucleation off the silica particles, the distribution of the particle sizes is large. However, using a feed rate that is below the nucleation rate, uniform colloidal silica particles can be produced. This is illustrated in FIG. 2, which shows 50 nm colloidal silica particles that were produced by the method described herein.

The initial surface area of the preformed colloidal silica particles is calculated by first measuring the specific surface area of the starting material by any number of convenient methods. The most common methods for doing this are the chemical titration using sodium hydroxide developed by George W. Sears in 1956 (the Sears method) and nitrogen absorption. The total amount of "seed" material is then multiplied by the specific surface area to come up with a total silica surface in the system. Subsequent surface area calculations take the initial silica in the system and add in the amount of silica added to that point in the reaction. For a manual operation, the period between recalculations may be several minutes, and the silica feed rate adjusted in stepwise fashion. Modern computer controls allow for the continuous recalculation of total surface area and can provide a continuously increasing feed rate. In effect, one integrates under the feed rate curve on a graph of feed rate versus time.

The silica sols can be concentrated by either evaporation or, more preferably, ultrafiltration to recover an aqueous silica sol containing 5%–55% by weight $SiO_2$ and having a pH of between 8 and 10.5. In the preferred embodiment ultrafiltration is used to wash out contaminating sodium by replacing the aqueous solution with deionized or distilled water while simultaneously adding a small amount of ultrapure potassium hydroxide to maintain the pH. Ultrafiltration is also useful to concentrate the silica sol to a desired concentration. The resulting silica sol also optimally has a sodium concentration of less than 10 ppm sodium, but more preferably, less than 1 ppm sodium. The silica sols generally have an average particle size of 8–200 nm and preferably of from 10–80 nm and a particle size distribution with coefficient of dispersion of 0.16–0.5 and preferably 0.16 to 0.25. These sols can exhibit long-term stability.

Experimental Procedure

Silica Sol Synthesis

EXAMPLE 1

A colloidal silica sol was produced generally in accordance with the methods outlined in U.S. Pat. No. 2,631,134 to Iler et al., incorporated herein in its entirety. Approximately 3 liters of Purolite C-106 cation exchange resin in the hydrogen form was suspended in 10 liters of deionized water in an agitated 5 gallon vessel and heated to 95 degrees Celsius. To this was rapidly added a volume of Zacsil E200 potassium silicate sufficient to deplete the ion-exchange resin, ending up with a final pH of 8.93. In this instance, 3,950 grams of the potassium silicate solution were required. The resulting colloidal suspension had an average particle size of 10.95 nanometers in diameter and a ratio of $SiO_2$ to $K_2O$ of 38.

A portion of this material was then further treated with the same type of potassium silicate and ion-exchange resin according to the method described herein to increase the size of the colloidal silica particles while maintaining the uniformity of the size of the particles. The purpose of this process is to increase the particle sizes of the silica through accretion of active silica onto a heel of smaller particles, or nuclei. In this fashion, the particles can be "grown" to 300 nanometers, or more, if desired. Twenty-five (25) gallons of material with an average particle size of 70 nanometers was produced. At this point, the material contained approximately 10% silica solids by weight.

The dilute sol was then concentrated, using an ultrafiltration unit, as is well known in the industry. In this fashion, the material was concentrated to approximately 35% $SiO_2$. When measured by atomic absorption, this suspension had a total sodium content of 8.3 parts per million. This included sodium in the carrier solution as well as any which may have been occluded within or adsorbed upon the silica particles themselves.

The ultrafiltration unit has the further desirable characteristic of removing dissolved species, such as salts along with the water in the permeate. This principle may be used to effect a process commonly referred to as diafiltration, or the dilution and removal of impurities through filtration. Once the material had been concentrated, five gallons of deionized water were added and the ultrafiltration continued in order to dilute and remove the sodium impurities. Once five gallons more permeate had been removed, which took 15–20 minutes, five more gallons of deionized water was added. This process was repeated until 50 gallons of water had been added to the suspension and 50 gallons of additional permeate had been removed. The pH of the suspension was maintained between 9 and 10 using commercially available reagent grade potassium hydroxide. When measured by atomic absorption, this suspension had a total sodium content of 0.6 parts per million in a product with a final concentration of 30% silica.

Reagent grade potassium hydroxide with a sodium content of approximately 100 ppm was added to the suspension for stability. The resultant slurrry, suitable for use in CMP, had a total sodium content of 2.2 ppm. It is estimated that, with potassium hydroxide produced as described herein, the total sodium content would not exceed 1.0 ppm.

EXAMPLE 2

The initial sol from example one above was used to produce a sol with an average particle size of 130 nanometers in diameter. As before, the accretion process described herein was used to effect the particle growth while maintaining the uniformity of the size of the particles.

The same process of ultrafiltration/diafiltration described in example one was used to concentrate the suspension and to dilute and remove dissolved impurities. In this case, the process started with 30 gallons of dilute sol, concentrated to about 35% solids. At this point, the sodium content was measured by AA to be 12.9 ppm. 60 gallons of diluting water was used, as described in example one, five gallons at a time. The final solution was measured at 1.2 ppm sodium content. When the reagent grade potassium hydroxide was added, the resultant 30% $SiO_2$ product contained 2.2 ppm sodium.

It, thus, will be appreciated that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A method for producing silica particles comprising the steps of:
   providing preformed colloidal silica particles having a surface area;
   measuring the surface area of said preformed particles;
   adding feed silica comprising an alkali metal silicate and a cation exchange resin at a rate which is less than a rate of nucleation of the added feed silica; and
   increasing said rate of adding said feed silica wherein said rate of adding said feed silicia remains less than said rate of nucleation of the added feed silica.

2. The method of claim 1, wherein the step of measuring said surface area is completed using the Sears method or the Nitrogen Absorption method.

3. The method of claim 1, further comprising the step of calculating a total silica surface area consisting of both said feed silica and said preformed colloidal silica.

4. The method of claim 3, wherein said rate is 10 or fewer grams of feed silica per 1000 meters squared of said total silica surface area per hour.

5. The method of claim 4, wherein said rate is 10 or fewer grams of silica per 1000 meters squared of said total silica surface area per hour at 90° C. or greater.

6. The method of claim 4, wherein a computer is used to continuously recalculate said total surface area.

7. The method of claim 6, wherein said computer continuously adjusts said rate.

8. The method of claim 1, wherein said alkali metal silicate is selected from the group consisting of sodium silicate, potassium silicate, lithium silicate, magnesium silicate, calcium silicate, and combinations thereof.

9. The method of claim 1, wherein said cation exchange resin is selected from the group consisting of carboxylic resins, sulfonated natural materials, and sulfonated styrene-dibenzene copolymers.

10. The method of claim 1, wherein the alkali metal silicate is a sodium or potassium silicate.

11. The method of claim 3, wherein said rate of adding said feed silica is adjusted as a function of the total silica surface area.

12. A method for increasing the size of colloidal silica particles comprising:
   (a) determining initial surface area of the colloidal silica particles;
   (b) adding silica to the colloidal silica particles at an addition rate sufficient to prevent nucleation of new silica particles;
   (c) determining total silica surface area, wherein total silica surface area comprises the initial surface area of the colloidal silica particles and surface area of added silica; and
   (d) continuously adjusting the addition rate based on changes in total silica surface area to increase the size of the colloidal silica particles and prevent nucleation of new silica.

13. The method of claim 12, wherein the silica comprises an alkali metal silicate from which the alkali metal has been removed by the presence of a cation exchange resin.

14. The method of claim 12, wherein said alkali metal silicate is selected from the group consisting of sodium silicate, potassium silicate, lithium silicate, magnesium silicate, calcium silicate, and combinations thereof.

15. The method of claim 12, wherein the size of the colloidal silica particles are produced having an average particle size of 8 to 200 nm.

16. The method of claim 12, wherein a computer is used to continuously recalculate said total surface area.

17. The method of claim 16, wherein said computer continuously adjusts said addition rate.

18. The method of claim 12, wherein the addition rate is 10 or fewer grams of silica per 1000 meters of total silica surface area per hour or at 90° C. or greater.

19. A method for producing uniform colloidal silica particles comprising:
   (a) determining initial surface area of the colloidal silica particles;
   (b) adding silica to the colloidal silica particles at an addition rate sufficient to prevent nucleation of new silica particles;
   (c) determining total silica surface area, wherein total silica surface area comprises the initial surface area of the colloidal silica particles and surface area of added silica; and
   (d) adjusting the addition rate based on changes in total silica surface area to produce uniformly sized colloidal silica particles and prevent nucleation of new silica particles.

20. The method of claim 19, wherein the size of the colloidal silica particles are produced having an average particle size of 8 to 200 nm.

21. The method of claim 19, wherein said alkali metal silicate is selected from the group consisting of sodium silicate, potassium silicate, lithium silicate, magnesium silicate, calcium silicate, and combinations thereof.

22. The method of claim 19, wherein a computer is used to continuously recalculate said total surface area.

23. The method of claim 19, wherein the addition rate is 10 or fewer grams of silica per 1000 meters of total silica surface area per hour at 90° C. or greater.

* * * * *